United States Patent [19]

Anderson et al.

[11] Patent Number: 4,481,165

[45] Date of Patent: Nov. 6, 1984

[54] SYSTEM FOR HANDLING AND STORING RADIOACTIVE WASTE

[75] Inventors: John K. Anderson, San Diego; Paul E. Lindemann, Escondido, both of Calif.

[73] Assignee: The United States of America as represented by the United States Department of Energy, Washington, D.C.

[21] Appl. No.: 399,934

[22] Filed: Jul. 19, 1982

[51] Int. Cl.³ .............................................. G21C 19/32
[52] U.S. Cl. ..................................... 376/272; 414/146
[58] Field of Search ............... 376/272, 269, 268, 264, 376/271, 262, 261; 252/633; 250/506.1, 507.1; 414/146, 290, 292, 289

[56] References Cited

U.S. PATENT DOCUMENTS

| | | | |
|---|---|---|---|
| 2,743,224 | 4/1956 | Ohlinger | 376/261 X |
| 3,081,886 | 3/1963 | Flexman et al. | 214/1 |
| 3,282,793 | 11/1966 | Jamrog | 376/272 X |
| 3,663,817 | 5/1972 | Sayers | 250/106 |
| 3,805,959 | 4/1974 | Mertens | 210/170 |
| 3,883,441 | 5/1975 | Murphy et al. | 252/301.1 W |
| 3,940,577 | 2/1976 | Christofer | 191/12 R |
| 4,053,067 | 10/1977 | Katz et al. | 376/268 |
| 4,069,766 | 1/1978 | Bernstein | 376/264 X |
| 4,168,243 | 9/1979 | Gablin et al. | 252/301.1 W |
| 4,172,506 | 10/1979 | Terry | 180/125 |
| 4,196,169 | 4/1980 | Gablin et al. | 422/159 |
| 4,209,420 | 6/1980 | Larker | 252/301.1 W |
| 4,366,114 | 12/1982 | Kuhnel | 376/272 X |

FOREIGN PATENT DOCUMENTS 2023078 12/1979 United Kingdom .

Primary Examiner—Richard E. Schafer
Assistant Examiner—Daniel Wasil
Attorney, Agent, or Firm—L. E. Carnahan; Roger S. Gaither; Michael F. Esposito

[57] ABSTRACT

A system and method for handling and storing spent reactor fuel and other solid radioactive waste, including canisters to contain the elements of solid waste, storage racks to hold a plurality of such canisters, storage bays to store these racks in isolation by means of shielded doors in the bays. This system also includes means for remotely positioning the racks in the bays and an access tunnel within which the remotely operated means is located to position a rack in a selected bay. The modular type of these bays will facilitate the construction of additional bays and access tunnel extension.

8 Claims, 16 Drawing Figures

SYSTEM FOR HANDLING AND STORING RADIOACTIVE WASTE

BACKGROUND OF THE INVENTION

The Government has rights in the invention disclosed herein which arose under, or in the course of, United States Department of Energy Contract No. DE-AT03-76ET35300 with the General Atomic Company.

The present invention relates to radioactive waste storing; and, more particularly, it relates to a system for handling and storing spent reactor fuel and other solid radioactive waste.

Spent reactor fuel and other forms of radioactive waste materials emit significant amounts of radiation. For this reason, such material must be stored in shielded vaults to assure adequate protection to the public and employees at the storage facilities. There is uncertainty concerning the national policies in the reprocessing of spent fuel and the requirements for the ultimate disposal of radioactive waste. This uncertainty establishes the need for long-term storage of spent fuel at the reactor site. The possible obsolescence and the significant cost of extended "on-site" storage facilities are two factors to be considered in the design of these long-term facilities. Other economic considerations are the uncertainty respecting the volume of material to be stored and the point in time when additional storage will be needed. These considerations imply that the long term facilities should be adjacent to other plant structures but functionally isolated since the first spent fuel will not require storage until an extended period of plant check out and low power operation has elapsed.

These and other unique problems associated with the radioactive waste materials require that the storage concept should be capable of being easily expanded, thereby, eliminating the need for constructing the entire facility prior to the initial plant operation.

It is, accordingly, a general object of the invention to provide an expandable system for handling and storing radioactive waste materials.

Another object of the invention is to provide a system capable of long-term storage of such waste materials.

Other objects, advantages and novel features of the invention will be apparent to those of ordinary skill in the art upon examination of the following detailed description and the accompanying drawings of a preferred embodiment of the invention.

SUMMARY OF THE INVENTION

The invention addresses the above mentioned problems and basically comprises a system for handling and storing radioactive waste. The system includes storage canisters to contain this waste, storage racks to hold the canisters, storage bays to store the racks, remote handling means to position the racks in the bays and an access tunnel to the various storage bays.

An important feature of the invention is that the storage facilities provided by the invention may be constructed in modules, thereby making unnecessary the construction of an entire facility prior to the initial plant operation. This modular approach minimizes initial expenditures and the potential obsolescence caused by eventual changes in national policies with respect to the requirements for the reprocessing of fuel and the ultimate disposal of radioactive waste.

A principal advantage of the invention is that it provides a very efficient method for transferring loaded storage racks into storage bays along an access tunnel and minimizes the shielded dead space required for the handling operation, while having the capability of being easily expanded.

DESCRIPTION OF THE PREFERRED EMBODIMENT

Reference will now be made in detail to the preferred embodiment of the present invention, examples of which are illustrated in the accompanying drawings.

While the invention will be described in connection with a preferred embodiment, it will be understood that it is not the intention to limit the invention to that embodiment. On the contrary, it is intended to cover all alternatives, modifications and equivalents, as may be included within the scope of the invention defined in the appended claims.

Figure 1:
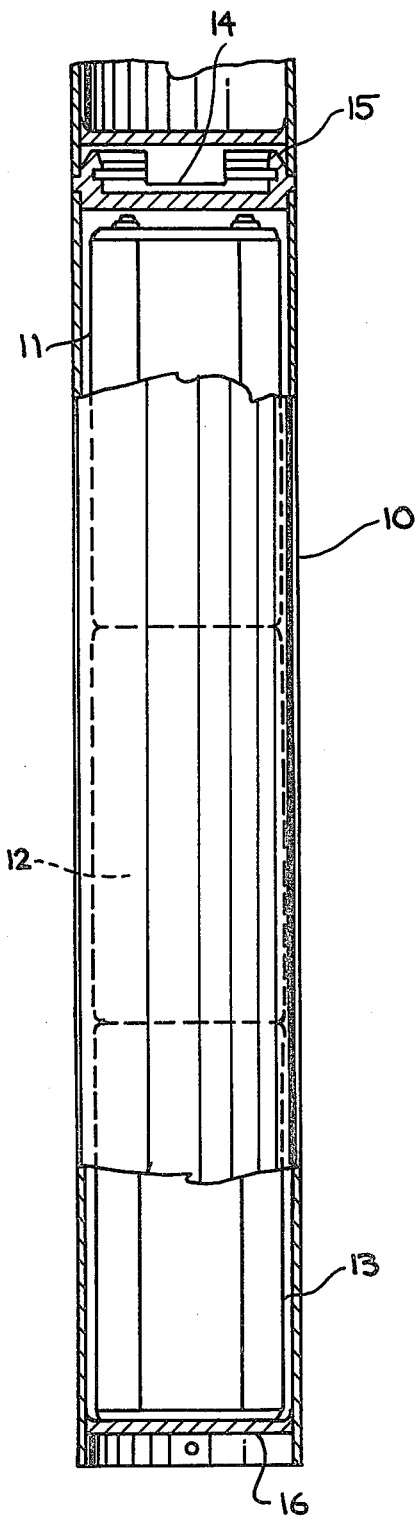
FIG. 1 is an elevation view, partially cut away, of a storage canister holding three spent fuel elements.

Referring to FIG. 1, a fuel storage canister or housing 10 is sized to hold spent fuel elements 11, 12 and 13. These fuel elements are constructed of graphite with fuel rods placed in vertical channels in the elements. The cannisters may also contain other solid waste products. The canister 10 consists of a casing or housing having an upper end cap 14 provided with handling member 15 which is sealed to the housing as by brazing. In its lower end, a cap or closure 16 is sealed to the housing as by welding or brazing to hold the fuel elements inside canister 10. This canister is a metal cylindrical container of 8 feet 6 inches in height and 17 inches in diameter, for example, and may be constructed of materials such as aluminum, stainless steel or carbon steel. The sealing technique mentioned above will effectively control the release of contamination from the fuel elements.

Figure 2:
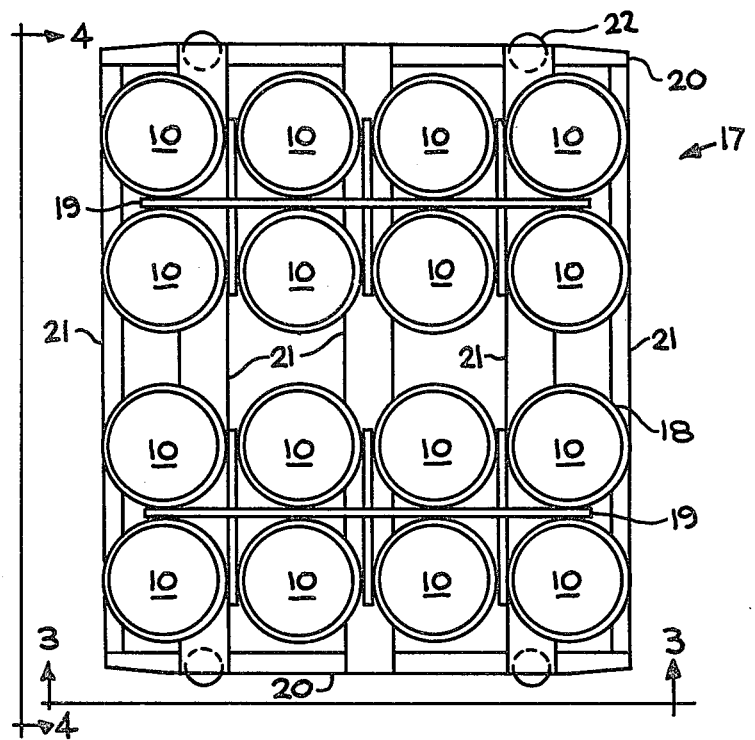
FIG. 2 is a plan view illustrating the general arrangement of a storage rack designed to hold 16 storage canisters of the FIG. 1 type.
Figure 3:
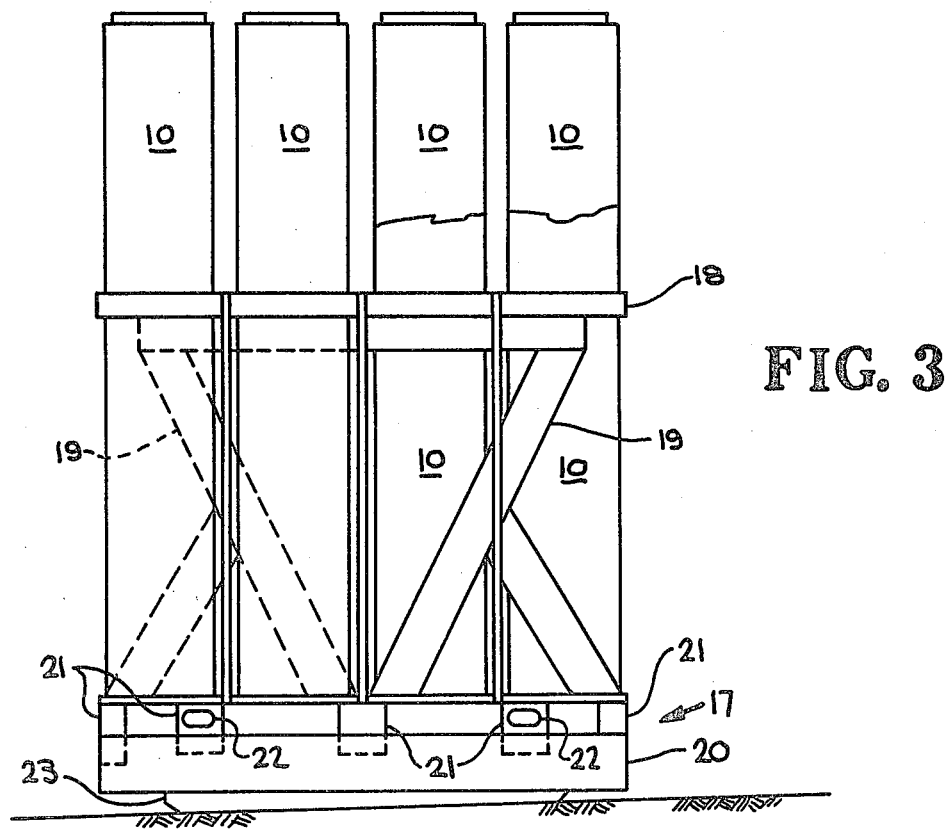
FIG. 3 is a side elevation of the storage rack taken along the line 3—3 of FIG. 2.
Figure 4:
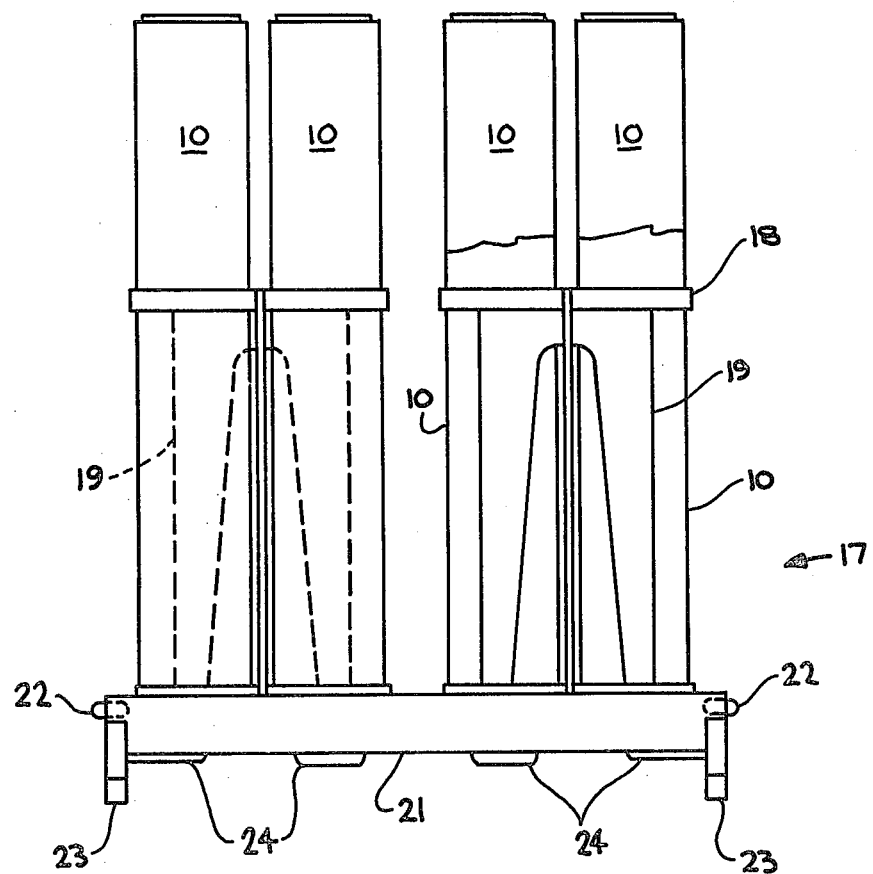
FIG. 4 is an end elevation of the storage rack taken along the line 4—4 of FIG. 2.

A storage rack 17 is illustrated in FIGS. 2, 3 and 4 and is designed to hold sixteen storage canisters 10 in vertical position during handling and storing operations. These canisters are arranged in rack 17 in such a way as to have four (4) canisters in each outside row. Rack 17 has a plurality of spacing rings 18 and members 19 arranged perpendicularly to the base of the rack so as to support and hold the canisters 10 in place. Also, the rack base is raised from the floor by two support rails 20 and five horizontal beams 21 attached to provide the necessary clearance for engaging an elevator assembly 30 (see FIG. 5). Four roller assemblies 22 assure minimal friction in the event of contact with the side walls of storage bays 54 (see FIG. 11). Tapered wedges 23 on the lower surface of the support rails 20 compensate for the incline built into the floor of the storage bays 54. Six load bearing pads 24 on the lower surfaces of the horizontal beams 21 provide a uniform stroke for all six hydraulic cylinders 38 (see FIG. 6A) in the elevator assembly 30 (see FIG. 5). The storage rack 17 may, for example, be 6 feet 7 inches by 8 feet with an overall height of 10 feet when loaded with canisters 10.

Figure 5:
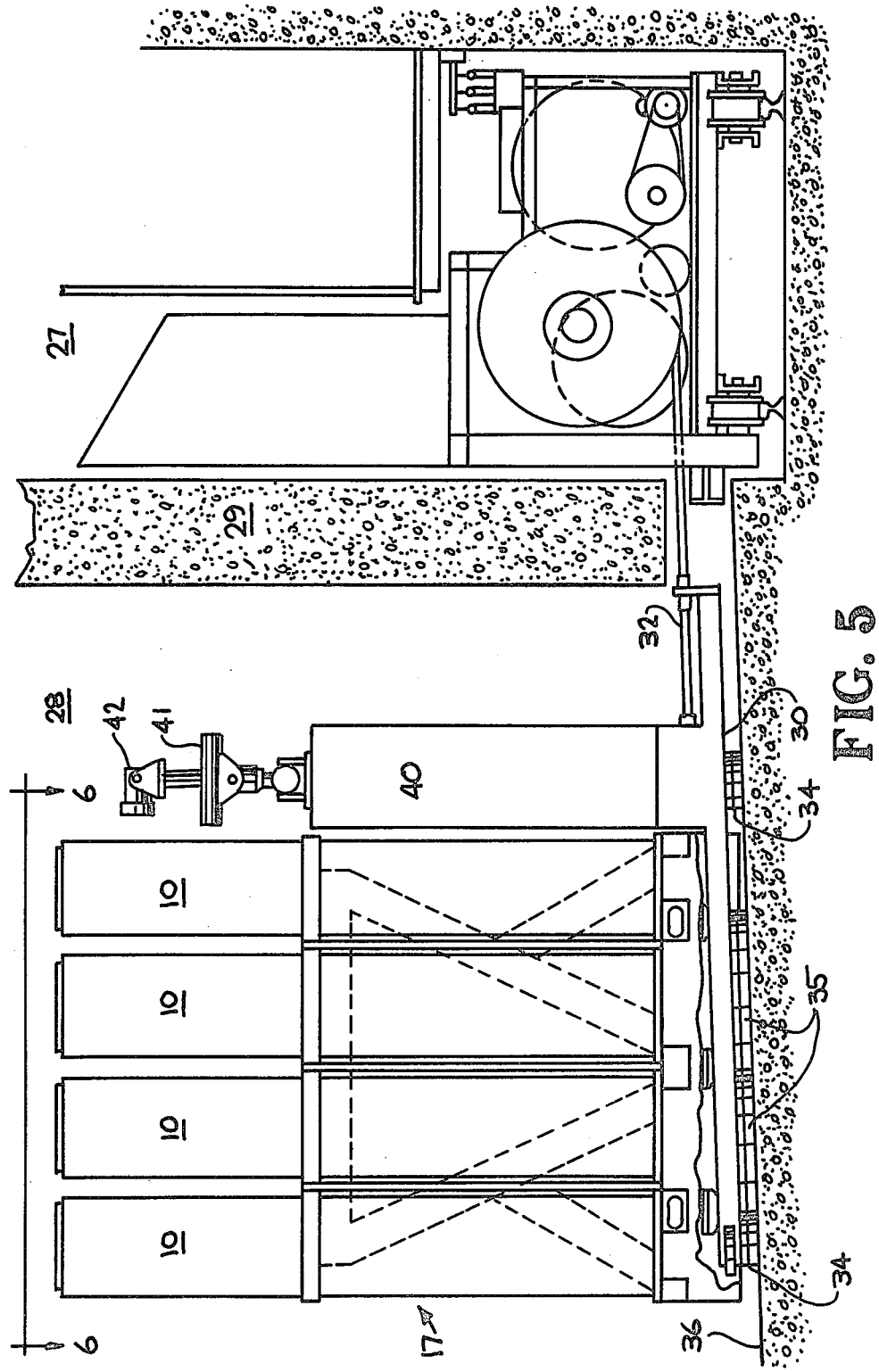
FIG. 5 is a side elevation of a storage rack elevator assembly with the storage rack and drive unit shown in phantom.
Figure 6A:
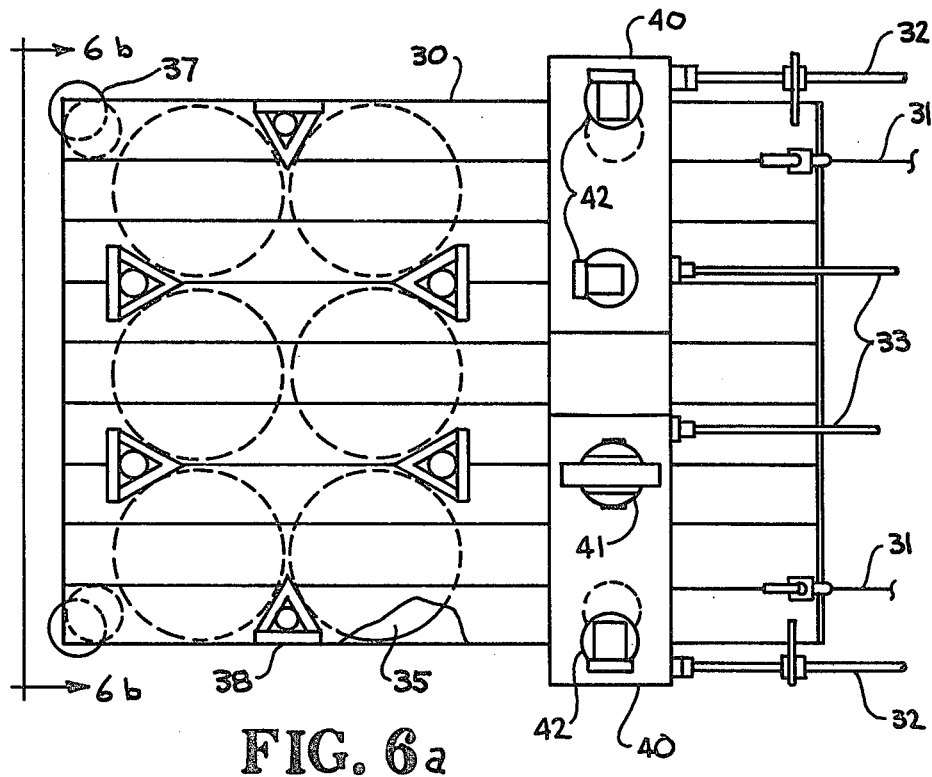
FIG. 6a is a plan view taken along the line 6—6 of FIG. 5.
Figure 6B:
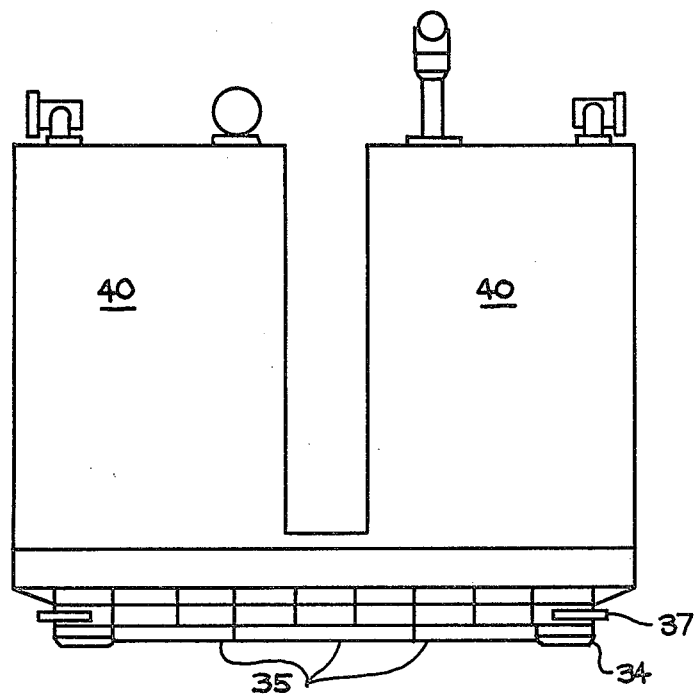
FIG. 6b is an end view of the storage rack elevator assembly of FIG. 5.

Referring to FIGS. 5, 6a and 6b, a drive unit 25 is supported on rails 26 located in a control tunnel 27. The control tunnel 27 is physically separated from a storage bay access tunnel 28 by a shield wall 29 suspended from the roof of the storage facility. The drive unit 25 is coupled to a storage rack elevator assembly generally indicated at 30 by a set of parallel wire ropes 31 (see FIG. 6A), and also by air hoses 32 and electrical cables 33. The drive unit 25 and attached elevator assembly 30 move along the parallel control and access tunnels 27, 28 and the parallel wire ropes 31 may be extended to allow the elevator assembly 30 to move away from the drive unit 25. It is understood that air hoses 32 and electrical cables 33 have sufficient length to allow for the extended length of wire ropes 31.

An essential element of this invention is the air film bearings 34 and 35 which provide a low profile, large load capacity and a very low coefficient of friction during the operation. Air bearings 34 and 35 are attached to the bottom surface of the storage rack elevator assembly 30. An inherent disadvantage of air film bearings is a tendency of the load to drift to the lowest point on an inclined surface unless it is externally restrained. This disadvantage is converted into an advantage in this invention by creating a slight inclination in the floor 36 of the storage bays, as seen in FIG. 5. When air is supplied to the air bearings 34 or 35, the elevator assembly 30 is lifted clear of the floor in the access tunnel 28 and because of this floor inclination, and the low coefficient of friction provided by the air bearings, it may be moved to another location with minimum effort. The four small air film bearings 34 are used for movements with an unloaded elevator assembly 30. The six large air film bearings 35 are used to move heavy loads. Two horizontal rollers 37 near the leading edge of the elevator assembly minimize potential friction while engaging a fuel storage rack 17.

Figure 7B:
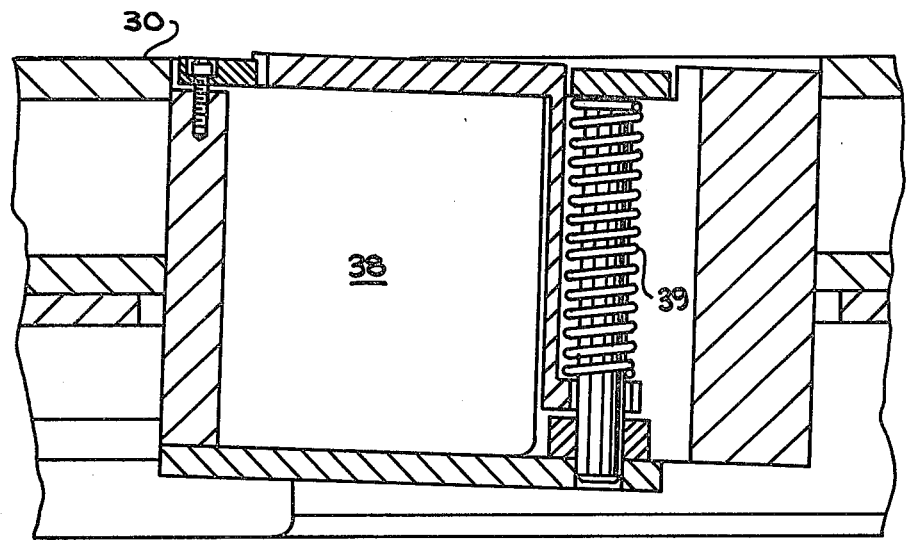
FIGS. 7a and 7b are enlarged views illustrating the construction of the hydraulic cylinders of FIG. 6A used to lift the storage rack a few inches off the floor for transport.
Figure 7A:
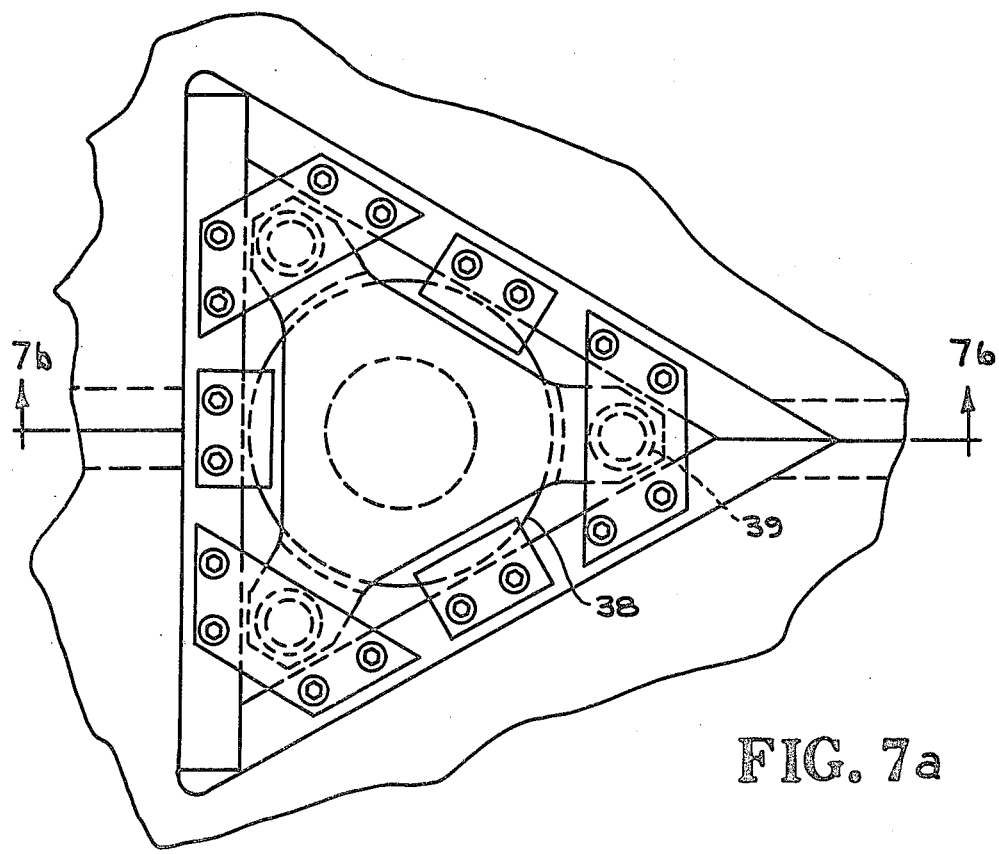

Linear actuators 38 illustrated in FIGS. 7a and 7b, are attached to the upper surface of the storage rack elevator assembly 30 (see FIG. 6A). These actuators are retracted with compression springs 39 to provide vertical clearance as the elevator assembly 30 is moved into position beneath the storage rack 17. As these actuators are extended, they contact the undersurface of rack 17, at the load bearing pads 24, and lift the rack clear from the floor 36 (see FIG. 5). A control module 40 (see FIGS. 5 and 6B) of the elevator assembly 30 contains the various pneumatic valves, pressure regulators and other devices required for operation of the linear actuators 38 and the two sets of air film bearings 34, 35. The control module 40 also supports a closed circuit television camera 41 and lights 42 (see FIG. 5). For example, the elevator assembly 30 has an overall width of 7 feet 10 inches and length of 9 feet 8 inches.

Figure 8:
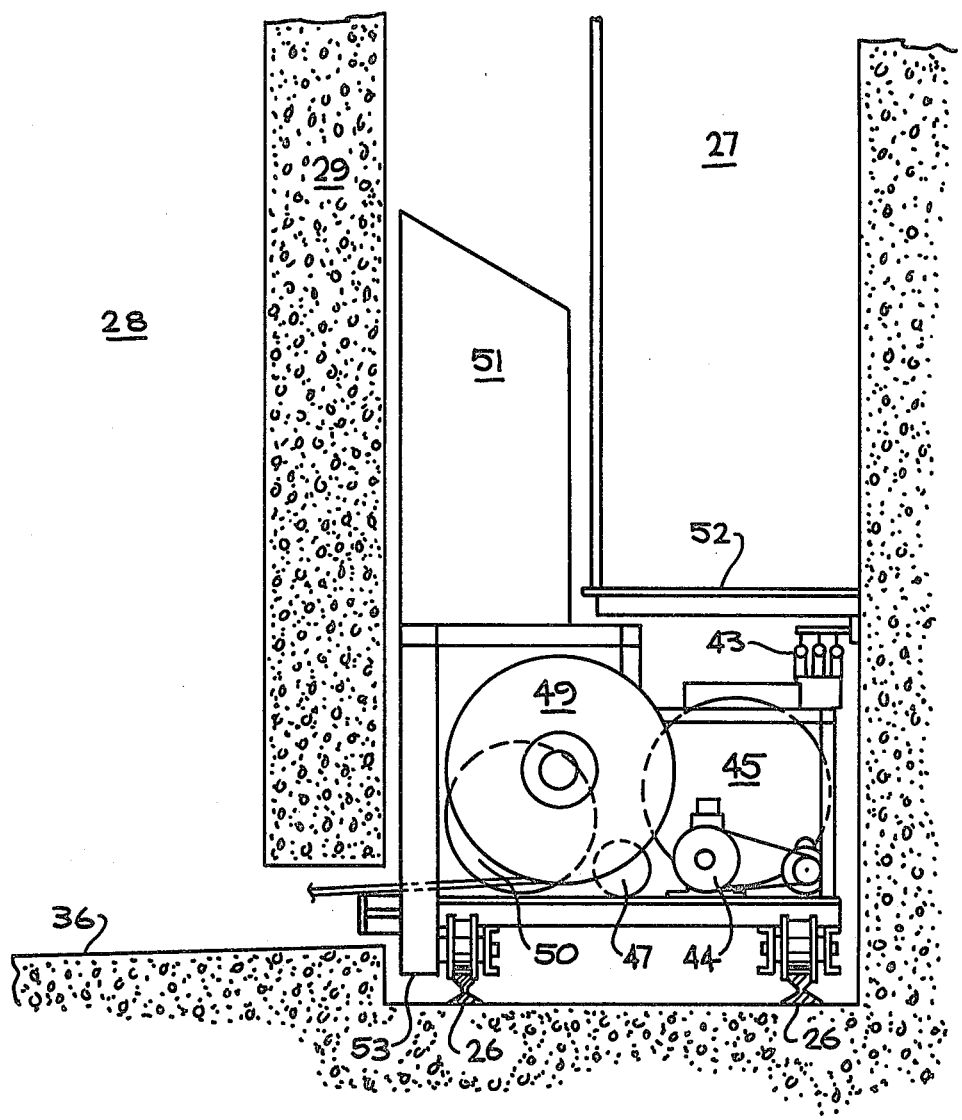
FIGS. 8, 9 and 10 illustrate an embodiment of the drive unit with FIGS. 9 and 10 taken along lines 9—9 and 10—10 of FIG. 8.
Figure 9:
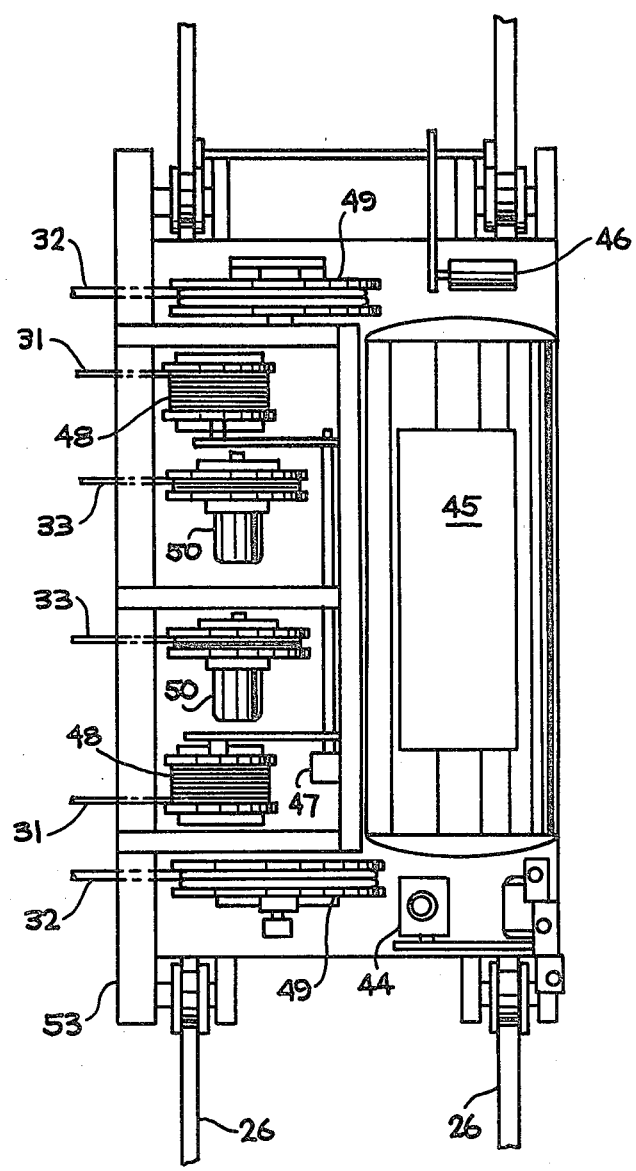
Figure 10:
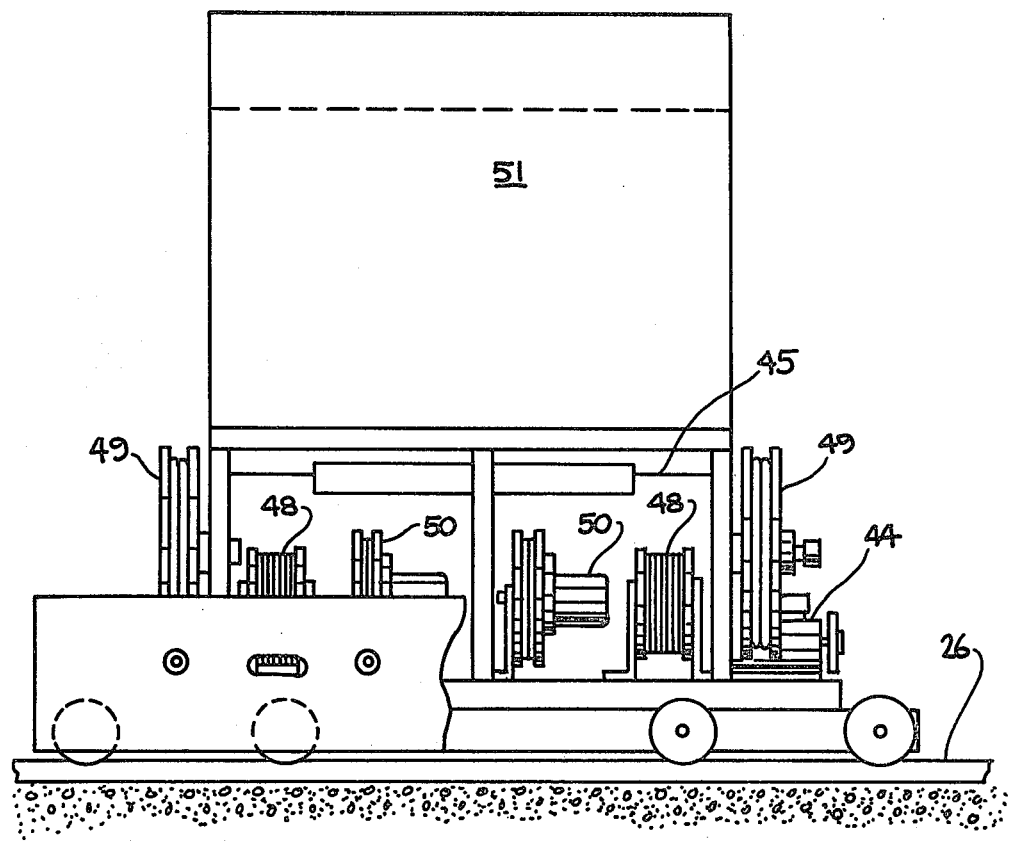

The drive unit 25 is illustrated in greater detail in FIGS. 8, 9 and 10. The drive unit receives electric power from a buss bar 43 mounted in the control tunnel 27. An air compressor 44 supplies air to a large storage tank 45. Compressed air powers a pneumatic motor 46 which moves the drive unit 25 along the control tunnel 27. Another pneumatic motor 47 drives a winch system 48 which extends or retracts the elevator assembly 30. Service lines or cables 32, 33 to the elevator assembly are stored on hose reels 49 and cable reels 50.

A control console 51 of the drive unit 25 houses all of the controls for the elevator assembly 30 and the drive unit plus a television monitor and camera controls, not shown, which provide remote viewing of the access tunnel 28. The drive unit is operated manually from an elevated platform 52, which extends the full length of the control tunnel 27.

A portable shield slab 53 is mounted to the drive unit 25 to minimize radiation streaming into the control tunnel 27.

Figure 11:
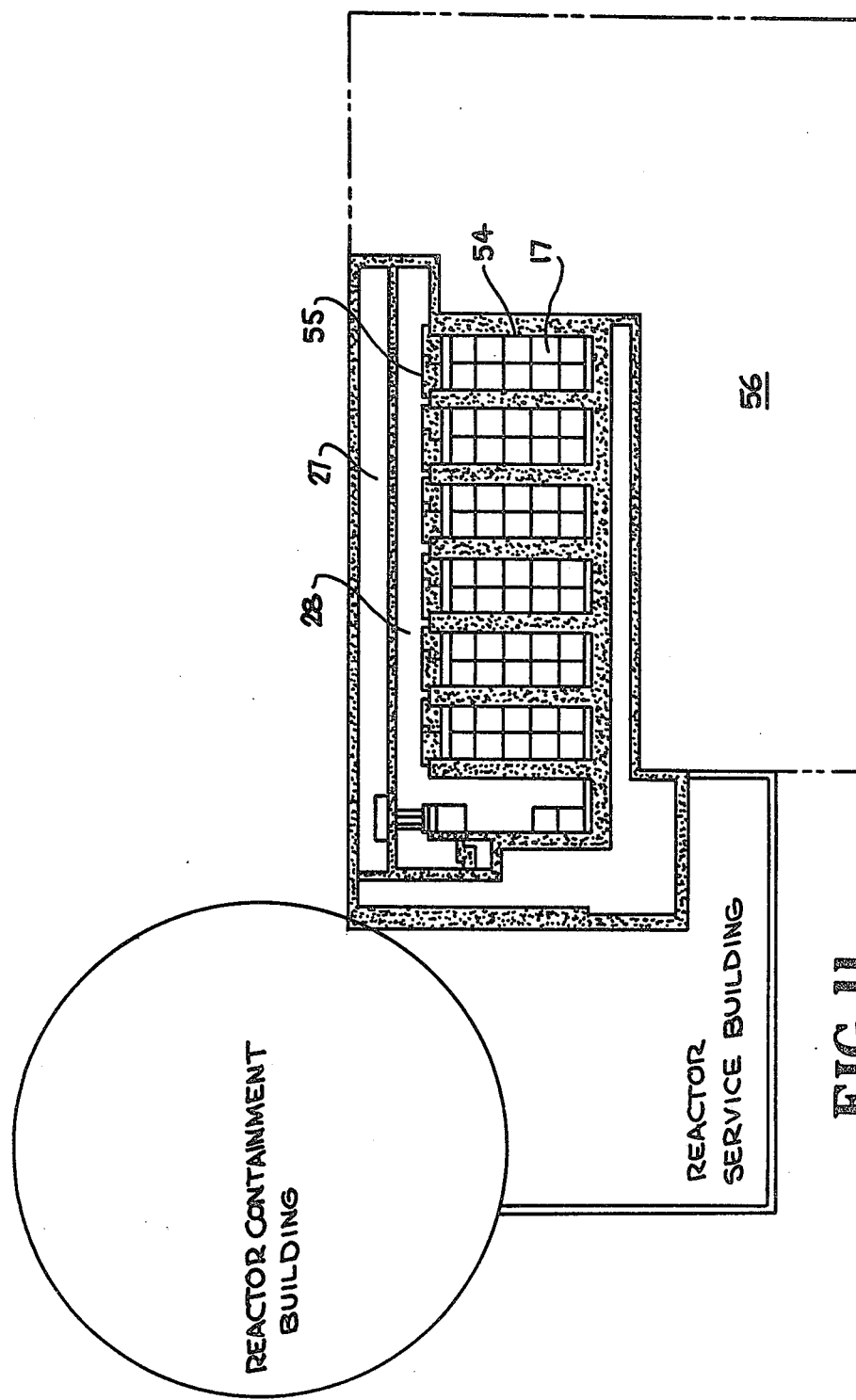
FIG. 11 illustrates one arrangement of the storage system of the invention at an HTGR site.
Figure 12:
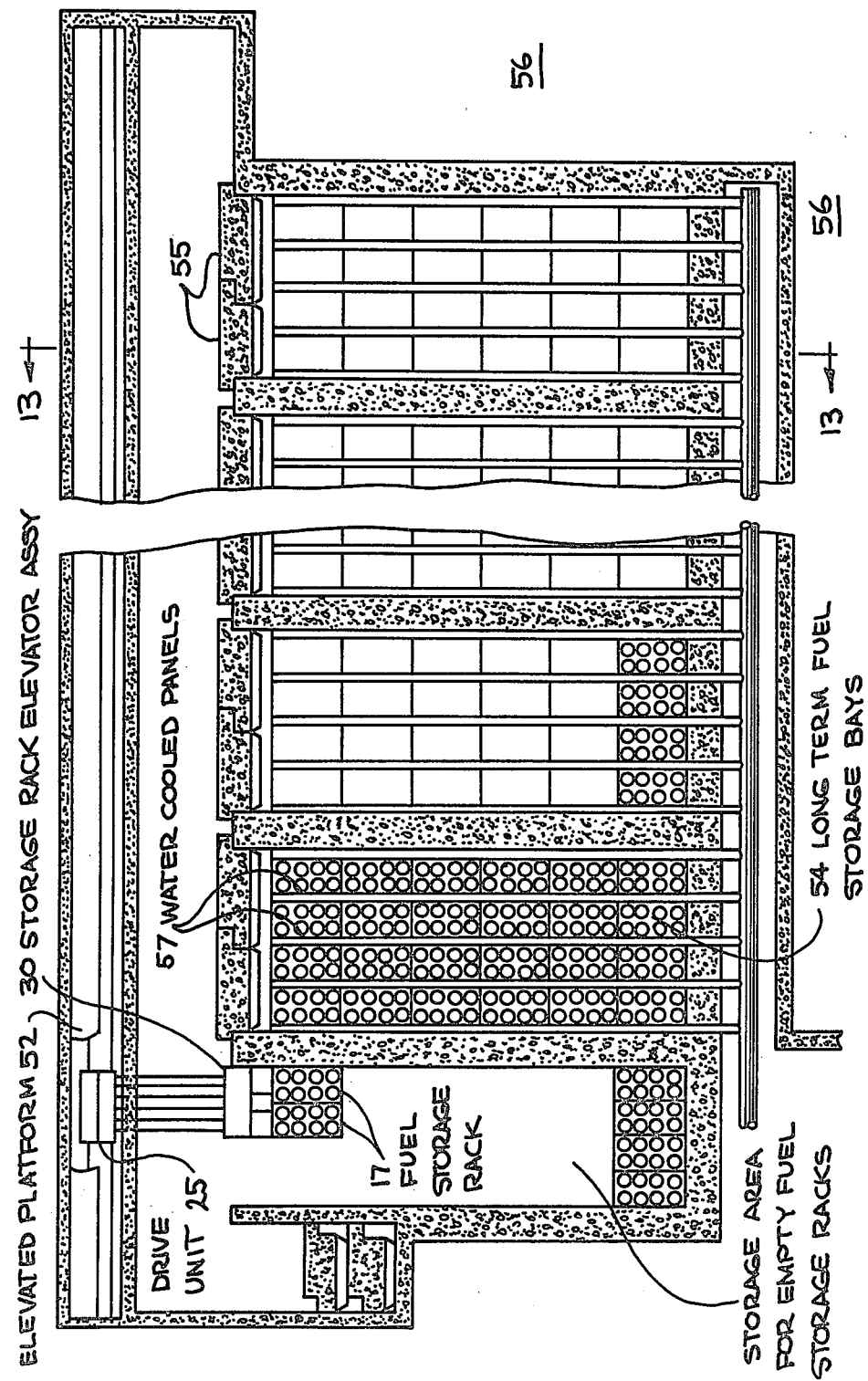
FIG. 12 is an enlarged plan view of the storage facility of the FIG. 11 arrangement.
Figure 13:
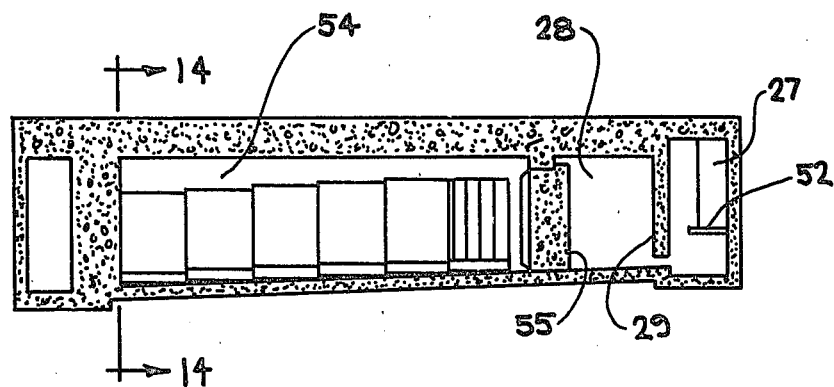
FIG. 13 is a side elevation of the storage facility taken along lines 13—13 of FIG. 12 and is comparable to FIG. 5 in orientation.
Figure 14:
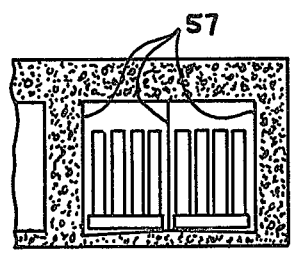
FIG. 14 is an end view of a typical storage bay taken along lines 14—14 of FIG. 13.

FIG. 11 illustrates the general arrangement of a fuel storage facility using this concept at a high temperature gas-cooled reactor (HTGR). In this arrangement, spent fuel is loaded into storage canisters 10 in a Reactor Service Building and the canisters are lowered into a storage rack 17 for transfer into storage bays 54. As illustrated, the storage bays 54 are perpendicular to the access tunnel 28 and the control tunnel 27. Each storage bay may be isolated from the access tunnel 28 with portable shield doors 55, similar to door 29 in FIG. 5. Additional space 56 is reserved for future expansion of the storage facility. FIGS. 12, 13 and 14 show the proposed construction in greater detail.

The transfer of a storage rack 17 is accomplished by first lifting the rack with the linear actuators 38. The rack is then moved to a new location by using the winches 48 to pull the rack 17 and the elevator assembly 30 into contact with the drive unit 25 whereafter the pneumatic drive motor 46 is activated to move the drive unit 25 and the elevator assembly 30 along the access tunnel 28 to the new location (i.e. storage bay). The winches 48 are then extended and the elevator assembly 30 with its storage rack load moves down into the storage bay 54 to the desired storage postion. The actuators 38 are then retracted transferring the weight of the rack to the floor 36. A number of sensors, control interlocks and the closed circuit television systems are used to assure the efficiency of these operations.

Another use of the elevator assembly 30 is to remove and replace the heavy shielded doors 55 of the individual storage bays 54 to isolate the spent fuel behind the shielded doors. The doors 55, which may be constructed of concrete with steel embedments, are removed and replaced by the same procedures used to handle storage racks 17. This safety measure will enable the controlled entry into the access tunnel 28 for maintenance of the elevator assembly 30. The shield doors will also enable the construction of additional storage bays, and an extension to the control and access tunnels 27, 28 in the space 56 reserved for future expansion, as shown in FIG. 11.

The long-term storage of spent fuel in the storage bays may require a minimum cooling. Among the several alternatives to provide this, the concept shown in FIGS. 12, 13 and 14 relies on heat transfer by radiation from the metal canisters 10 to water cooled panels 57 mounted on the walls and ceiling of the storage bays 54.

In addition, gas sensor lines in the vault ceiling should be installed to detect leaking containers. In the event of unacceptable leakage, the particular storage rack containing the defective containers is returned to the sealing facility for further testing and repairs.

The foregoing description of a preferred embodiment of the invention has been presented for purposes of illustration and description and is not intended to be exhaustive or to limit the invention to the precise form disclosed. The embodiment was chosen and described in order to best explain the principles of the invention and their practical application to thereby enable others skilled in the art to best utilize the invention in various embodiments and with various modifications as are suited to the particular use contemplated.

We claim:

1. A system for handling and storing solid radioactive waste, comprising:
   at least one storage canister for containing solid radioactive waste;
   at least one storage rack for holding said canister, said storage rack including floor incline compensating means;
   at least one storage bay for storing said rack, said storage bay having an inclined surface;
   means for providing access to said bay including an access tunnel and a control tunnel, said access and control tunnels being in open communication only along a lower portion of said tunnels; and
   means for remote handling of said rack in said access tunnel for positioning said rack in said bay, said remote handling means including:
   a drive unit located in said control tunnel,
   a storage rack elevator assembly located in said access tunnel and operatively connected to said drive unit, said storage rack elevator assembly including air bearing means, and
   portable shield means secured to said drive unit to minimize entry of radiation into said control tunnel from said access tunnel.

2. A system as recited in claim 1, wherein said canister includes:
   handling means secured to an upper end of said canister.

3. A system as recited in claim 2, wherein said canister contain a plurality of waste elements.

4. A system as recited in claims 1 or 3, wherein said rack holds sixteen of said canisters in a vertical position.

5. A system as recited in claim 1, wherein said inclined surface of said storage bay consists of a slight inclined floor to create controlled drift to a lower point in said bay.

6. A system as recited in claims 1 or 5, wherein said remote handling means comprises:
   said drive unit located at the control tunnel;
   said storage rack elevator assembly operatively coupled to and movably supported from said drive unit;
   means for energizing said elevator assembly with respect to said rack for moving said rack;
   said air bearing means of said elevator assembly comprising a plurality of air bearings attached to a bottom surface of said elevator assembly; and
   means for supplying air to said air bearings from said drive unit for lifting said elevator assembly.

7. A system as recited in claim 1, further comprising:
   means for providing minimum cooling to said storage bay having cooling panels for removing heat from said storage canisters.

8. A system as recited in claim 1, further comprising:
   a shielded door to isolate said radioactive waste in said storage bay; and
   means for remotely removing and replacing said door.

* * * * *